(12) United States Patent
Denton et al.

(10) Patent No.: US 8,887,290 B1
(45) Date of Patent: Nov. 11, 2014

(54) METHOD AND SYSTEM FOR CONTENT PROTECTION FOR A BROWSER BASED CONTENT VIEWER

(75) Inventors: Sean Denton, Florence, TX (US); Robert Boenau, Cedar Park, TX (US); Lance E. Ellisor, Austin, TX (US); Robert Todd Warren, Pflugerville, TX (US)

(73) Assignee: Libredigital, Inc., Austin, TX (US)

( * ) Notice: Subject to any disclaimer, the term of this patent is extended or adjusted under 35 U.S.C. 154(b) by 169 days.

(21) Appl. No.: 13/274,665

(22) Filed: Oct. 17, 2011

Related U.S. Application Data (60) Provisional application No. 61/455,310, filed on Oct. 18, 2010.

(51) Int. Cl.
*G06F 12/00* (2006.01)
(52) U.S. Cl.
USPC .......................................................... 726/26
(58) Field of Classification Search
USPC .......................................................... 726/26
See application file for complete search history.

(56) References Cited

U.S. PATENT DOCUMENTS

| | | | | |
|---|---|---|---|---|
| 6,609,198 | B1* | 8/2003 | Wood et al. | 713/155 |
| 7,073,199 | B1* | 7/2006 | Raley | 726/26 |
| 7,743,259 | B2* | 6/2010 | Raley et al. | 713/193 |
| 7,861,307 | B2* | 12/2010 | Dionne | 726/26 |
| 8,234,217 | B2* | 7/2012 | Derrenberger | 705/51 |
| 2005/0050100 | A1* | 3/2005 | Chin | 707/104.1 |
| 2006/0179153 | A1* | 8/2006 | Lee et al. | 709/231 |
| 2008/0027750 | A1* | 1/2008 | Barkeloo et al. | 705/1 |

OTHER PUBLICATIONS

Qin Jiancheng, Bai Zhongying, and Bai Yuan, "Polymorphic Algorithm of JavaScript Code Protection", ISCSCT '08, International Symposium on vol. 1, Dec. 22, 2008, pp. 451-454.*

* cited by examiner

*Primary Examiner* — William Powers
(74) *Attorney, Agent, or Firm* — Sprinkle IP Law Group (57) ABSTRACT

Embodiments as disclosed herein may utilize one or more of a set of security measures to protect digital content distributed to browser based viewers to protect this digital content against improper, unintended or undesired uses.

24 Claims, 8 Drawing Sheets

| | 000 | 001 | 002 | 003 | 004 | 005 | 006 | 007 | 008 | 009 | 00A | 00B | 00C | 00D | 00E | 00F |
|---|---|---|---|---|---|---|---|---|---|---|---|---|---|---|---|---|
| 0 | NUL | DLE | SP | 0 | @ | P | ` | p | FAQ | DCP | NBSP | ° | À | Ð | à | ð |
| 1 | SOH | DC1 | ! | 1 | A | Q | a | q | HOP | FU1 | ¡ | ± | Á | Ñ | á | ñ |
| 2 | STX | DC2 | " | 2 | B | R | b | r | BFN | FU2 | ¢ | ² | Â | Ò | â | ò |
| 3 | ETX | DC3 | # | 3 | C | S | c | s | HSN | STS | £ | ³ | Ã | Ó | ã | ó |
| 4 | EOT | DC4 | $ | 4 | D | T | d | t | IND | COM | ¤ | ´ | Ä | Ô | ä | ô |
| 5 | ENQ | NAK | % | 5 | E | U | e | u | MEL | MW | ¥ | µ | Å | Õ | å | õ |
| 6 | ACK | SYN | & | 6 | F | V | f | v | SSN | SRN | ¦ | ¶ | Æ | Ö | æ | ö |
| 7 | BEL | ETB | ' | 7 | G | W | g | w | ESA | EPN | § | · | Ç | × | ç | ÷ |
| 8 | BS | CAN | ( | 8 | H | X | h | x | NT1 | SOS | ¨ | ¸ | È | Ø | è | ø |
| 9 | HT | EM | ) | 9 | I | Y | i | y | NT3 | SSO | © | ¹ | É | Ù | é | ù |
| A | LF | SUB | * | : | J | Z | j | z | VTP | DCI | ª | º | Ê | Ú | ê | ú |
| B | VT | ESC | + | ; | K | [ | k | { | FLD | CSI | « | » | Ë | Û | ë | û |
| C | FF | FS | , | < | L | \ | l | \| | FLU | ST | ¬ | ¼ | Ì | Ü | ì | ü |
| D | CR | GS | - | = | M | ] | m | } | RI | OFC | SMV | ½ | Í | Ý | í | ý |
| E | SO | RS | . | > | N | ^ | n | ~ | SSZ | PM | ® | ¾ | Î | Þ | î | þ |
| F | SI | US | / | ? | O | _ | o | DEL | SSS | RPC | ¯ | ¿ | Ï | ß | ï | ÿ |

STANDARD UNICODE TABLE 710

700

U+0000

DOUBLE-BYTE CHARACTER RANGE
720

DOUBLE-BYTE PRIVATE RANGE
730

METHOD AND SYSTEM FOR CONTENT PROTECTION FOR A BROWSER BASED CONTENT VIEWER

RELATED APPLICATIONS

This application claims a benefit of priority under 35 U.S.C. §119 to U.S. Provisional Patent Application No. 61/455,310 entitled "Method and System for Content Protection For Browser Based Reader" by Sean Denton, et al., filed Oct. 18, 2010, the entire contents of each are hereby expressly incorporated by reference for all purposes.

TECHNICAL FIELD

This invention relates generally to the distribution of digital content. Specifically, embodiments relate to the field of normalizing access to digital content and the protection of accessed digital content. More particularly, certain embodiments relate to the protection of digital content that is distributed to browser based content viewers.

BACKGROUND

Newspapers, magazines, trade journals, books or any other type of content have existed in various forms for several hundred years. With the advent of electronic communication devices, however, it is increasingly desired by consumers to view such content using such electronic devices.

Accordingly, digital content has become popular. However, most electronic publications are generated in a single, final form, suitable for a specific purpose or device. Adapting these electronic publications to a different device entails reprocessing the original content. In some cases, point-to-point file generation (i.e., transforming the original content format to the required output format) may be utilized. If the requirements of the output format change or if an additional output format is required, these approaches may entail repeating the entire file transformation and generation process, including the quality control steps necessary to ensure that the file transformation is accurate. Additionally, since various formats have their own distinct capabilities regarding the details of the content, point to point transformation has the potential for loss of fidelity with each transformation. This is similar to the loss of fidelity in transforming graphic files from one format (e.g., tif) to another (e.g., jpg).

Digital content (such as electronic books) has historically been consumed in closed ecosystems, such as dedicated through dedicated readers (e.g. Kindles, Nooks, eReaders, etc.) or through application based reading systems such as those provided by Apple on its devices (iPhone, iPad, etc.). They are closed ecosystems in the sense that digital content is delivered to them in a proprietary format and is accessible only on that one device, or may only be accessed using a particular proprietary application on that device.

To address the limitations of such proprietary system, digital content may be provided according to a totally open concept, where such digital content may be accessed substantially anywhere with no protection of this digital content. In most cases, however, content providers may be unhappy with the arrangement as it permits unfettered distribution of such digital content and places limitations on the generation of revenue streams from such content.

What is desired then is to normalize the distribution of digital content such that the digital content can be accessed across different devices and to implement a set of security measures to protect this digital content against improper, unintended or undesired uses.

SUMMARY

As discussed above, it is desired to normalize the distribution of digital content such that the digital content can be accessed across different devices. To that end, embodiments as disclosed herein may utilize a browser based content reader. As most networked devices may have some form of browser as is known in the art, this browser may serve as a basis for a browser based reader application. This browser based reader application may for example, comprise JavaScript that may access and present digital content through the browser. Such a reader may leverage the emerging HTML 5 and CSS 3 standards to more effectively present such digital content, including by, for example, allowing interactivity and off-line caching for content, greatly expanding the usefulness of such reader applications. Accordingly, using such a browser based reader digital content can be accessed on almost any device, the time between discovery of desirable content and access to that content can be substantially lessened.

It is of course still desirable to protect digital content distributed to such browser based readers. Currently, however, there is really no reliable digital rights management (DRM) for browser distributed content. Thus, embodiments as disclosed herein may utilize one or more of a set of security measures to protect digital content which will be distributed to such browser based readers to protect this digital content against improper, unintended or undesired uses. Such techniques may include, mapping the set of characters of the portion of content to a double-byte font; deleting cached files after they are rendered by the browser based reader application; encrypting the digital content such that it is encrypted when stored at the user's system, randomly assigning filenames for digital content, using a proxy to regulate access to the digital content, time bounding sessions or access to digital content; disabling the copying of rendered digital content or a variety of other techniques.

Embodiments as disclosed herein thus pertain to a method for securing digital content presented in a browser based viewer, including receiving digital content, wherein the digital content comprises one or more portions, storing each of the one or more portions of digital content in a different directory, receiving a user name and a password from a browser at a user computer device, establishing an authenticated session with the browser, providing a browser based viewer (i.e. a browser based reader application) to the browser on the user computer device, receiving a request for a portion of digital content from the browser based viewer, providing a location of the portion of digital content to the browser based viewer, wherein the location is different from the directory corresponding to the portion of digital content, receiving a request for the location from the browser based viewer, determining the directory corresponding to the portion of digital content based on the request and the authenticated session and providing the portion of digital content to the browser based viewer from the first directory.

In certain embodiments, the path of the directories is algorithmically determined, the browser based viewer is obfuscated JavaScript code, the portion of digital content is a bitmap, the portion of digital content is tagged by the browser based viewer when it is rendered, one or more menus of the browser are disabled by the browser based viewer or copying and pasting is disabled in the browser by the browser based viewer.

These, and other, aspects of the invention will be better appreciated and understood when considered in conjunction with the following description and the accompanying drawings. The following description, while indicating various embodiments of the invention and numerous specific details thereof, is given by way of illustration and not of limitation. Many substitutions, modifications, additions or rearrangements may be made within the scope of the invention, and the invention includes all such substitutions, modifications, additions or rearrangements.

BRIEF DESCRIPTION OF THE DRAWINGS

The drawings accompanying and forming part of this specification are included to depict certain aspects of the invention. A clearer impression of the invention, and of the components and operation of systems provided with the invention, will become more readily apparent by referring to the exemplary, and therefore nonlimiting, embodiments illustrated in the drawings, wherein identical reference numerals designate the same components. Note that the features illustrated in the drawings are not necessarily drawn to scale.

DETAILED DESCRIPTION

The invention and the various features and advantageous details thereof are explained more fully with reference to the nonlimiting embodiments that are illustrated in the accompanying drawings and detailed in the following description. Descriptions of well known starting materials, processing techniques, components and equipment are omitted so as not to unnecessarily obscure the invention in detail. It should be understood, however, that the detailed description and the specific examples, while indicating preferred embodiments of the invention, are given by way of illustration only and not by way of limitation. Various substitutions, modifications, additions and/or rearrangements within the spirit and/or scope of the underlying inventive concept will become apparent to those skilled in the art from this disclosure. Embodiments discussed herein can be implemented in suitable computer-executable instructions that may reside on a computer readable medium (e.g., a HD), hardware circuitry or the like, or any combination.

As used herein, the terms "comprises," "comprising," "includes," "including," "has," "having" or any other variation thereof, are intended to cover a non-exclusive inclusion. For example, a process, article, or apparatus that comprises a list of elements is not necessarily limited only those elements but may include other elements not expressly listed or inherent to such process, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

Additionally, any examples or illustrations given herein are not to be regarded in any way as restrictions on, limits to, or express definitions of, any term or terms with which they are utilized. Instead, these examples or illustrations are to be regarded as being described with respect to one particular embodiment and as illustrative only. Those of ordinary skill in the art will appreciate that any term or terms with which these examples or illustrations are utilized will encompass other embodiments which may or may not be given therewith or elsewhere in the specification and all such embodiments are intended to be included within the scope of that term or terms. Language designating such nonlimiting examples and illustrations includes, but is not limited to: "for example," "for instance," "e.g.," "in one embodiment."

Embodiments of the present invention can be implemented in a computer communicatively coupled to a network (for example, the Internet), another computer, or in a standalone computer. As is known to those skilled in the art, the computer can include a central processing unit ("CPU"), at least one read-only memory ("ROM"), at least one random access memory ("RAM"), at least one hard drive ("HD"), and one or more input/output ("I/O") device(s). The I/O devices can include a keyboard, monitor, printer, electronic pointing device (for example, mouse, trackball, stylus, etc.), or the like. In embodiments of the invention, the computer has access to at least one database over the network.

ROM, RAM, and HD are computer memories for storing computer-executable instructions executable by the CPU or capable of being compiled or interpreted to be executable by the CPU. Within this disclosure, the term "computer readable medium" or is not limited to ROM, RAM, and HD and can include any type of data storage medium that can be read by a processor. For example, a computer-readable medium may refer to a data cartridge, a data backup magnetic tape, a floppy diskette, a flash memory drive, an optical data storage drive, a CD-ROM, ROM, RAM, HD, or the like. The processes described herein may be implemented in suitable computer-executable instructions that may reside on a computer readable medium (for example, a disk, CD-ROM, a memory, etc.). Alternatively, the computer-executable instructions may be stored as software code components on a DASD array, magnetic tape, floppy diskette, optical storage device, or other appropriate computer-readable medium or storage device.

In one exemplary embodiment of the invention, the computer-executable instructions may be lines of C++, Java, HTML, or any other programming or scripting code. Other software/hardware/network architectures may be used. For example, the functions of the present invention may be implemented on one computer or shared among two or more computers. In one embodiment, the functions of the present invention may be distributed in the network. Communications between computers implementing embodiments of the invention can be accomplished using any electronic, optical, ratio frequency signals, or other suitable methods and tools of communication in compliance with known network protocols.

Additionally, the functions of the disclosed embodiments may be implemented on one computer or shared/distributed among two or more computers in or across a network. Communications between computers implementing embodiments can be accomplished using any electronic, optical, radio frequency signals, or other suitable methods and tools of communication in compliance with known network protocols.

As discussed above, it is desired to normalize the distribution of digital content such that the digital content can be accessed across different devices. To that end, embodiments as disclosed herein may utilize a browser based content reader. As most networked devices may have some form of browser as is known in the art, this browser may serve as a basis for a browser based reader application. This browser based reader application may for example, comprise JavaScript that may access and present digital content through the browser. Such a reader may leverage the emerging HyperText Markup Language (HTML) 5 and Cascading Style Sheets (CSS) 3 standards to more effectively present such digital content, including by, for example, allowing interactivity and off-line caching for content, greatly expanding the usefulness of such reader applications. Accordingly, using such a browser based reader digital content can be accessed on almost any device, the time between discovery of desirable content and access to that content can be substantially lessened.

It is of course still desirable to protect digital content distributed to such browser based readers. Currently, however, there is really no reliable digital rights management (DRM) for browser distributed content. Thus, embodiments as disclosed herein may utilize one or more of a set of security measures to protect digital content which will be distributed to such browser based readers to protect this digital content against improper, unintended or undesired uses. As discussed in more detail later, such techniques may include, obfuscating the JavaScript used to implement the browser based reader, abstracting the directories at a content provider where the content provided is accessed, using double-byte mapping, using an abstraction layer, using session authentication and allowing only one session per user or time bound sessions, delivering only a portion of content to the browser based reader, deleting cached files after they are rendered by the browser based reader application; encrypting the digital content such that it is encrypted when stored at the user's system, randomly assigning filenames for digital content, disabling the copying of rendered digital content, using double-byte mapping or tagging in conjunction with provided content, or a variety of other techniques.

Figure 1:
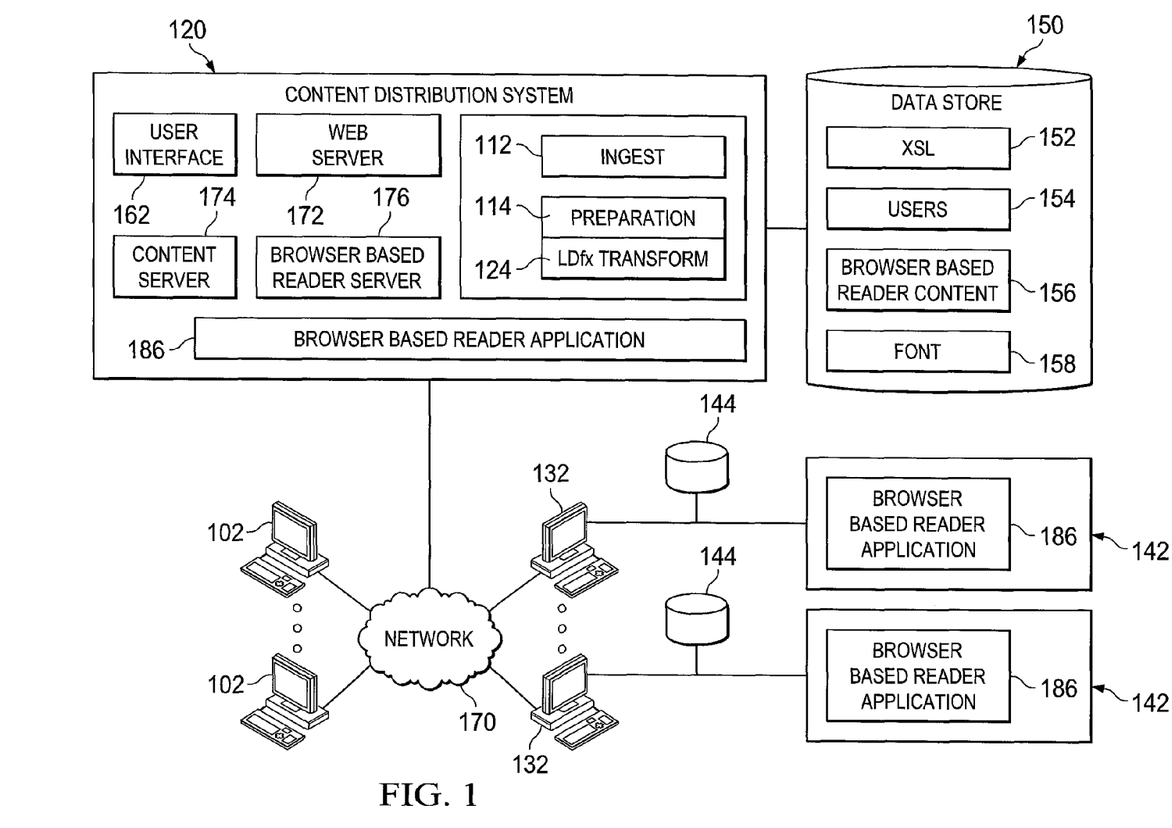
FIG. 1 is a diagram of an embodiment of a system.

Referring first to FIG. 1 a diagram of an embodiment of a content distribution system 120 coupled to one or more content provider systems 102 and user systems 132 over a network 170 (which may, for example, be an intranet, a LAN, a WAN, the Internet, etc.) is depicted. The content distribution system distribution 120 may receive digital content in one or more formats from the content providers 102. These formats may include, for example, a .pdf format, an XML feed, or an ePub (for example, as promulgated by the International Digital Publishing Forum). Digital content may include any almost any material desired, for example digital versions of papers, newsprint material, newspapers, magazines, books, etc. Content distribution system 120 may provide digital content to one or more user systems 132.

In order to view such digital content, reader applications may be present on user systems 132. Thus, for example, such user systems 132 may include home or laptop computers executing a reader application such a Microsoft Reader, a mobile device executing a reader application, a dedicated document reader such as a Kindle, a Sony Reader, an Agebook by EBS Technology, or almost any other type of computing device that comprises one or more reader applications for viewing digital documents. These reader applications may, however, only be operable to be utilized with digital documents of certain formats. For example, an Amazon Kindle may not be operable for use with a digital document in the .epub format while a Sony Reader may be operable for use with this type of format.

In one embodiment, it may be desired that such digital content be viewable substantially without regard to a type of user system 132 or the software (e.g. operating system or the like) being executed by the user system 132. To address this concern, a browser based viewer 186 (also referred to herein as a browser based reader application) may be provided by content distribution system 120. This browser based reader application 186 may be a set of computer executable instructions that may be executed by the browser 142 (or other software or hardware) on the user's computer 132 that allow a user to perform actions associated with digital content and may render such digital content for presentation to a user. For example, browser based reading application 186 may be JavaScript, HTML, other types of executable instructions or markup languages, etc.

This browser based reader application 186 may be accessible through a browser application 142 executing on the user system 132. Content distribution system 120 may thus provide a location such as domain, a web site, web page located at a URL, a web service, directory, etc. that may be accessed utilizing a browser 142 on a user's system 132. It will be noted that this location, the content distribution system 120 or portions thereof may be provided in a cloud computing environment such as for example, Amazon Elastic Compute Cloud (EC2). When this location is accessed the browser based reader application 186 may be provided to the user's browser 142 where it is executed or otherwise rendered such that digital content may be accessed through the browser based reader application 186 executing on the browser 142 on the user's system 132. Embodiments of such a browser based reader application 186 will be elaborated on in more detail later herein.

As digital content may be provided in a variety of formats from content provider 102 but may be desired in a format for use with browser based reader application 186, content distribution system 120 may transform digital content received in one format from content provider system 102 to this type of format. Accordingly, content distribution system 120 includes an ingest module 112 for receiving such digital content from content provider systems 102, a content preparation module 114 for transforming such digital content from a first format to a second format.

Embodiments as depicted herein may utilize a canonical format such that digital content may be transformed into this canonical format (referred to herein as the LDfx format). This canonical format may facilitate the transformation of the digital content to a format provided through the browser based reader application 186. Embodiments of such content formats and the transformation process are discussed in more detail in U.S. patent application Ser. No. 13/220,870, entitled "Method and System for Transforming and Storing Digital Content," incorporated fully herein by reference.

Digital content may thus be transformed from this canonical format into a format configured for use with browser based reader application 186. This browser based reader content 156 is stored in data store 150. The browser based reader content 156 may be in a format associated with a particular version of the browser based reader application 186. For example, a version of a book in browser based reader content 156 may be associated with a corresponding version of browser based reader application 186.

In one embodiment this browser based reader content 156 may be separated into one or more logical portions. Thus, for example, if the digital content is a book, the browser based reader content 156 corresponding to the book may be separated into a set of portions where each portion corresponds to a chapter of the book; if the digital content is a magazine or newspaper, the browser based reader content 156 corresponding to the magazine or newspaper may be separated into a set of portions where each portion corresponds to an article, etc. Other possibilities of the logical division of types of digital content into suitable portions will be apparent to those of skill in the art.

Architectural safeguards may be utilized in conjunction with this storage of the browser based reader content 156 to ensure that unauthorized access to digital content does not occur. More specifically, in one embodiment directory abstraction may be employed at the content distribution system 120 such that each of a set of portions of content associated with a particular piece of digital content may be stored at a different location in data store 150. For example, the directories and subdirectories in which the portions of the content are stored may have names that are algorithmically determined so they will not resemble logical locations. By storing portions of browser based reader content 156 at different locations the difficulty of locating or accessing these portions of digital content may be increased.

Security precautions may also be employed in conjunction with the formation of the portions of digital content stored in browser based reader content 156. In one embodiment, the portions of content may comprise one or more bitmaps, such that copying the content of the portion may be made more difficult when they are rendered. For example, when a portion of digital content comprises a chapter, each page of the chapter may be a bitmap which can only be rendered as an image such that the portion of digital content comprises a set of bitmaps, where each bitmap can be rendered for display to the user through the browser based reader application 186. These bitmaps may for example, include a screen capture or other replica format of a portion of content instead of the actual text. The use of bitmaps for a portion of content may prevents copying and pasting of the text of a portion of content. Similarly, individual letters of a portion of digital content may be formed as image glyphs such that the digital content never exists on the user's browser as text, but is instead is displayed as images of that text.

Double-byte mapping may also be utilized to form portions of content. Conversion of received content into a double-byte mapped format for storage as browser based reader content 156 and the subsequent rendering of this content using the browser based reader application 186 may utilize one or more font files 158. Each font file 158 may comprise a definition of a double-byte font. eXtensible Stylesheet Language (XSL) file 152 may be XSL configured to convert content according to the font file 158, which may, in one embodiment, entail encoding a portion of content according to the font of a font file 158 by mapping the original characters of the portion of content to the characters of the font of that font file 158. This double-byte mapping will be explained later on herein in more detail.

A user at user system 132 may be provided with the ability to access digital content to which they have rights and have that content delivered and presented to them in a desired manner. User interface module 162 may be presented to a user, for example using browser 142. The user interface module 162 may receive a user identifier or other type of user authentication information and based on user accounts 154 stored in the data store 150 obtain a set of identifiers for content items to which the user has access rights. For example, the user account 154 may have a list of ISBN numbers corresponding to books that the user has purchased, either through the content distribution system or another location. A list of the identified content items may be presented to the user. For example, a display that resembles a bookshelf having books associated with the identified content items may be presented or another format may be used. A user may select a particular content item based on the display presented.

More specifically, in certain embodiments, user interface module 162 may provide an interface such as a web site or application interface that may be accessed by a user from the user's device 132. The user may be authenticated through this interface such that a user identifier may be provided. Using the provided user identifier then, the user account 154 corresponding to the user may be accessed and the content items to which the user has access rights determined. The user interface module 162 may then form an interface to present the list of these content items to the user at the user's device 132 through the user's browser 142. This interface may, for example, present a likenesses of books with titles corresponding to the content items to which the user has access when it is rendered.

Using the interface presented on browser 142 by user interface 162 then, the user may identify content which he desires access. At this point the browser based reader application 186 may be delivered to the user's browser 142 and when executed by the browser 142 may allow the user to access a portion of the browser based reader content 156 associated with the identified content.

It may be useful here to discuss embodiments of such interfaces and browser based reader application 186 in more detail. As discussed above, it may be desired to normalize the distribution of digital content such that the digital content can be accessed across different devices. Accordingly, embodiments as disclosed herein may utilize browser based content reader 186. It will be understood that while embodiments of such a browser based reader may be utilized in conjunction with a user interface 162 to provide content to a user, other embodiments of a browser based reader application 186 as disclosed herein may be utilized with other content delivery modules utilized in conjunction with the content distribution system 120 or be provided standalone to a user's browser and the security measures disclosed herein may be applied in conjunction with a browser based reader substantially without regard to the context in which such a browser based reader 186 is utilized.

Specifically, in one embodiment, browser 142 executing on user's systems 132 may conform to the HTML5 and CSS 3 standards. Thus, digital content from content distribution system 120 may be accessed using this browser 142. More specifically, one of the interfaces provided by the content distribution system 120 may comprise a browser based reader 186 for use with HTML 5 and CSS 3. The browser based reader 186 may comprise JavaScript configured for execution by the browser 142 such that browser based reader content 156 provided by content distribution system 120 may be rendered using the browser based reader 186 executing on the browser 142 and presented to the user using the browser 142.

To increase the security of the browser based reader application 186, the browser based reader application 186 may comprise JavaScript that has been obfuscated. This obfuscation may be performed on the code comprising the browser based reader 186 using for example, an obfuscator such as ProGuard, rGuard, DashO or any other type of obfuscator known in the art. Thus, the effort required to for an end user to read the JavaScript of the browser based reader application 186 may be significant.

Browser based reader 186 may allow for functionality such as interactivity with a user at the user's system 132. Furthermore, in some embodiments a browser based reader application 186 may cache digital content in a cache 144 at the user's computer system 132 allowing interactivity and off-line access to digital content greatly expanding the usefulness of the browser based reader 186. Whether such caching is allowed or not may be determined through a variety of configuration settings, including setting associated with the browser based reader application 186 or the browser 142 at the user computer 132.

A number of security measures may be employed in conjunction with embodiments of browser based readers 186 to protect distributed digital content against improper, unintended or unauthorized use. These security measures may be layered with one another to increase the difficulty of unauthorized access or distribution of such digital content and may be employed such that these security measures may need to be circumvented with respect to individual portions of digital content. By increasing the difficulty of circumventing such measures the likelihood of a user obtaining such digital content through legitimate means may be increased.

Figure 2:
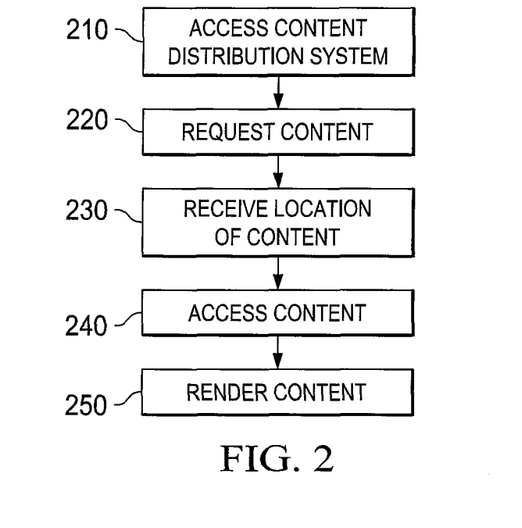
FIG. 2 is a diagram of one embodiment of a method for securitizing the distribution of content.

Turning to FIG. 2, a flow diagram for one embodiment of employing security in conjunction with distributing of digital content from a content distribution system in conjunction with a browser based reader is depicted. At step 210 a user at a user system 132 may access the content distribution system 120 using a browser 142. The content distribution system 120 may, in one embodiment employ an architecture for supporting the browser based reader application 186 that employs a web server 172, a content server 174 and a browser based reader server 176 which may be a Java server employing asynchronous JavaScript and XML (AJAX) or the like.

These various servers may communicate or otherwise interact with one another to service requests received from a browser based reader application 186 executing on the browser 142 of the user system 132 and to provide content to the executing browser based reader application 186 in response to these requests. The communication between these servers and between these servers and an executing browser based reader application 186 may utilize a session authentication system for authenticating to content (e.g. which utilizes an authenticated session which maintains state or a security token exchange system which may, for example, be useful in securing the browser based reader content 156.

Thus, when a user logs in using the user interface 162 as presented on his browser 142, the browser based reader server 176 may authenticate the user name and password provided, and provide browser based reader application 186 to the browser 142 at the user's computer 132 with a valid token. Thus a reading session for a user using the browser based reader application at the user's browser 142 can be established.

The session established may be bounded according to one or more factors to enhance security. For example, if a session authentication system for authenticating to content is being utilized and the user (or another user who may be malicious) attempts to initiate another session with the same credentials the user any previous sessions may be terminated or alternatively, the attempt to establish a new session may be refused. If, a security token exchange system is utilized the browser based reader server 176 may require that a new token be utilized for every access, thus, if it is attempted to utilize the same token twice the browser based reader server 176 may not allow that access or may terminate the session altogether. Additionally, such tokens may have a time to live (e.g. in which such tokens may be utilized). Thus, if such a token expires the user may be automatically logged off, thus such sessions may be timer bound.

Thus, in certain embodiments, in instances of a synchronous log-on using the same credentials the oldest session associated with those credentials is terminated. In this manner, only one active session can be maintained for a particular set of credentials with the newer session receiving preference over an older session. These sessions may be time-bound by way of session timeouts (e.g. sessions can only last a particular amount of time) or restriction placed on access to certain digital content by date. In other words, access can be bounded by date or time, so particular digital content can only be accessed during particular time period (for example, between two dates). Moreover, IP address restriction may be employed with respect to these sessions, by which access during a session can be confined to a particular IP address (such as the IP address from which the session was originated). This restriction may ensure that if a link to digital content is sent to another user and this link used to attempt to access the digital content, the session of the original user may be terminated or the new access using the link can be disallowed.

When a user is authenticated, the browser based reader application 186 may be sent to the user's computer 132 and a new instance (e.g. a new window) of browser 142 may be spawned for execution of the browser based reader application 186. As noted above the browser based reader application 186 may comprise JavaScript that has been obfuscated. Thus, the effort required to for a user to read the JavaScript is significant. Moreover, if any user attempts to disable the JavaScript of the browser based reader application 186 or to circumvent any of the security measures implemented by the browser based reader 186, the reader 186 may be rendered entirely, or partially, inoperable. Furthermore, when the browser based reader application 186 is executed initially it may automatically detect if a developer tool such as Firebug by Mozilla or the like is being executed and if such a developer tool is detected, terminate execution of the browser based reader application 186.

When the browser based reader application 186 is executed in this window it may then request desired content from the web server 162 using a token at step 220. As discussed above, the browser based reader content 156 of a piece of content is stored as a set of related portions, which may be stored in different locations. Thus, only a portion of content intended to meet a user's need may be requested by the browser based reader application 186. These portions may be meaningful portions, such as chapters, pages, lines, paragraphs, individual letters, etc. or may be of arbitrary size. For example, using the browser based reader application 186 a portion (that may be of predetermined size typically a chapter, article, or which may be based on the architecture of the files in an ePub package of the digital content, etc.) may be requested.

Each time the browser based reader application 186 requests content the browser based reader server 176 authenticates the request using the token provided in the request. Thus, the request from the browser based reader application 186 may need to contain a valid security component (e.g. the proper token) in order to access the desired content.

The web server 172 may then query the content server 174 for the location of the requested browser based reader content 156. The content server 174 returns the location of this browser based reader content 156, where the location is in a form that is specific to the content server 174. The web server 172 may have a secured connection with content server 174. For example, the browser based reader content 156 may be located in a directory that is redirected on the server side. Thus, the location returned to the web server 172 by the content server 174 may be accessed by web server 172, but may not be directly accessed or may not be a callable resource directory.

In fact, in one embodiment, the location returned to the web server 172 may be an identifier of a directory where the desired content 156 is located. Access to the directory returned to the web server 172 may be reliant on the token exchange between the browser based reader server 176 and the browser based reader application 186. Thus, when the location is accessed by browser based reader application 186 through web server 172 a valid token must be utilized to determine where the desired content is actually located in data store 150 otherwise such content cannot be accessed and returned to the browser based reader application 186.

More specifically, in one embodiment, when browser based reader 186 accesses a particular location, it may send a request that includes an identifier of the desired content along with a session identifier that may be a previously received token. Web server 172 may check this request against a time interval to ensure that a user is not requesting over a certain amount of content in a particular time period, which may indicate unauthorized use. Web server 172 then passes that request to browser based reader server 176 which parses the location of the desired content and the session identifier in the request and determines the location of content is going to be based on the session identifier. This location can be returned back to the browser based reader 186 which may then access the desired content at the provided location through web server 172. Thus, the actual location (e.g. directory) in data store 150 where a portion of browser based reader content 156 content is stored is never passed directly to the browser based reader application 186 and it may be impossible to read that location without session token or other authentication system used between the web server 172 and content server 174.

As these tokens may be dynamic in nature, related content may be stored in different locations on the data store 150, where access to each of these locations may require different and dynamically changing security. Additionally, as the location returned to a user may correspond to only one portion of content even if such security is breached only that portion of the content corresponding to that location may be compromised.

As only web server 172 may access this location, and any accesses to the content at this location must go through web server 172, internet users cannot access digital content by "hacking" to discover or navigate to a URL containing the content. This is because no such URL—one that can be accessed directly from an internet user—exists. In other words, the digital content is never directly exposed to the internet in any fashion. Rather, all digital content may be accessed through an abstraction layer administered by operators of the content distribution system.

The web server 172 thus receives the location of the desired browser based reader content 156 from the content server 174 and returns it to the browser based reader 186 executing on the browser 142 at step 230. The browser based reader application 186 may then access the content at this location at step 240 though web server 172 using the token provided by the browser based reader server 176. The web server accesses the desired content and provides the desired content to the browser based reader application 186 executing in the user's browser 142 which, in turn, renders this content for presentation to the user.

To further increase security, in one embodiment, the portions of content returned may be tagged by inserting certain images in the portions (for example, a particular image glyph). In this manner, copying of such image based digital content can be detected. By including unique tags (which may for example, be use, session, or IP specific) copying may be detected and traced to a specific user, date or time. Textual watermarking may also be utilized in certain embodiments. This textual watermarking may entail the comingling of non-viewable randomized text with the digital content in the portion of digital content to be sent to the user. When rendered according to the CSS utilized with browser based reader application 186 for whom the portion of digital content is intended these textual watermarks may be rendered invisibly such only the actual digital content appears as desired. However, if the portion of digital content is copied and rendered on a different browser or with a different CSS what is rendered may be a useless collection of letters and words, which (due to the randomness) cannot be removed with scripts to search & replace. It will be noted that this process may occur at the content distribution system 120 at the time that content is provided or may be done by the browser based reader application 186 when such content is rendered as will be discussed in more detail at a later point herein.

In one embodiment, before such portions of content are provided to the browser based reader application 186 the portion may be encrypted (e.g. by content server 174, web server 172 or browser based reader server 176). This encryption may be accomplished by almost any methodology desired, for example, using a T-algorithm or the tiny encryption algorithm (TEA). The key used for encryption of the portion of content may be unique to each session by for example using a variable associated with the session (e.g. a timestamp) as an initialization vector for creation of such a key.

Additionally, the key may be unique to each portions of content delivered. For example, to further prevent unauthorized access to portions of content, the encryption key may be session based and continuously cycled to prevent programmatic decryption. In other words, different keys may be used in conjunction with the same portion of digital content when that content is delivered in a different, or within the same, session. In some embodiment, to increase the efficacy of this digital key cycling the portions of digital content may be made smaller, for example such portions may be pages, paragraphs, lines or potentially even an individual letters. Increasing the granularity of the portions may make intrasession key cycling more atomic and thus making the entirety of the digital content extremely difficult to decipher.

The browser based reader application 186 may render the received content in a manner that does not require the storage of the content in any memory location (e.g. cache) not associated with the instance of the browser associated with the executing instance of the browser based reader application 186. In one embodiment, this rendering may present the portion of content as image in the browser based reader application 186 by converting the portion of content from text to image or image to image.

Part and parcel with this, in one embodiment, when new content is received from content distribution system 120, and the browser based reader application 186 renders this content for presentation to the user, any previous content received and rendered by the browser based reader application 186 may be overwritten or repopulated with the newly received content. Thus, the old content may no longer be resident anywhere on the user's computer device 132 once new content is received. If this content is desired at a later point (e.g. a user which to reads a previously read article or chapter) the content must be re-requested from the content distribution system 120.

In order to render the content, in one embodiment browser based reader application 186 may need to decrypt the content. Using the key stored in at a location at the user's computer 132 decryption of the portion of digital content may occur within the browser based reader application itself. In particular, in one embodiment, the browser based reader application reads the file for the portion of digital content, access the decryption key and decrypts the content. In this manner, the portion of digital content is never stored in the clear and is only decrypted at runtime by the reader application itself.

While the key to decrypt such content may be delivered from the content distribution system 120 it may not be desired to store the key (e.g. in the clear) in the JavaScript, or memory, associated with the browser based reader 186. Thus, in one embodiment the key for decryption of a portion of content may be included in a binary executable that serves as an add on to browser. When such an add on is retrieved and installed the browser based reader application 186 may have access to the key needed for decryption of the content portion and the key may never be stored on the user's system in the clear.

In a default setting where a secure socket layer (SSL) connection may be utilized, caching may be turned off and content may not be cached by browser based reader application 186. In some embodiments, however, one or more portions of digital content delivered to the user's computer system 132 may be cached in cache 144 such that it can be made available to the browser based reader 186 at a alter point. For example, browser 142 may be notified in a header of a communication comprising the portion of digital content that the provided portion of digital content is to be cached (or alternatively, is not to be cached). By caching the portion of digital content, offline access to this content may be enabled. To increase the security of this content, offline reading of cached files can be disallowed if desired.

While the nature of the content delivered as described herein may make unauthorized use of such content generally more difficult, it may be desired to implement additional security steps when such content is stored in cache 144. In certain embodiments the portion of content provided to the user may be encrypted. Thus, the portion of digital content that is stored in cache 144 is likewise encrypted. Thus, in one embodiment, after reading and decrypting content files stored in cache 144, these files are deleted.

Accordingly then, when the portion of digital content is provided from the content distribution system 120 to the user, the encrypted portion may be stored in the cache 144 and the key associated with that portion may be stored in a different location on the user's system 132. The filenames for content stored in the cache may also be randomly assigned. Thus, each distinct portion may receive an individual and arbitrary filename portion to increase the difficulty of locating such files on the user's system 132. The arbitrary filename coupled with the encryption may serve to confuse a user looking at such files and prevent the user from accurately discerning the nature of these files.

Additionally, each time a portion of digital content is received by the browser based reader application 186 the encryption key corresponding to that portion of digital content may be saved in the same location at the user's computer 132. When a new portion of digital content is delivered to the browser based reader application 186 from content distribution system 120 the key for that newly delivered portion may overwrite the key that was previously saved in that location for a previously received portion of digital content. Thus, even if a previous portion of digital content is found in cache 144 after a new portion is received, the key corresponding to the previous portion of digital content will have been overwritten and as such, because the portion of digital content is encrypted, without this key it cannot be read. Furthermore, because, as mentioned above, the code comprising the browser based reader application 186 may be obfuscated, it may be difficult for a user to determine the location where the key itself is stored.

Security measures may also be employed with respect to the rendering of the digital content by the browser based reader application 186. Because content may be transformed by the browser based reader application 186 when rendering the content, and the browser based reader application 186 may have established an authenticated session with a specific user, the identity of such a user and other information about the session such as the date or time, the device being used, and possibly the IP address of the user's connection is known to the browser 142 at the user's computer 142.

Thus, during the transformation process by the browser based reader application 186 the content being transformed may be tagged. This tagging may comprise the inclusion if an encrypted string of information, one which contains unique identifying information about the user of the content and the session from whence it was derived, in the bits of a bitmap image, such that they are a) undetectable by ordinary means and b) unreadable except by decryption. This process is known alternatively as digital watermarking or image stenography. The use of the digital watermarking or image stenography may enable the detection & forensic tracking of unauthorized distribution of copyrighted content (unauthorized sharing or republication). Image data can be searched to seek the presence of the digital watermark, and then the originator of the shared file can be traced.

Other methods of protecting content which has been rendered may also be utilized, in certain embodiments users may be prevented from copying rendered digital content as text to clipboard. To accomplish this, events associated with copying such as selecting, copying, pasting, etc. may be intercepted to ensure that these events are not executed or the evidence of the execution of these events is not displayed to the user (e.g. no highlighting, etc.). Furthermore, the browser based reader application 186 may disable features in a browser that allows copying or printing from the browser. Additionally, windows (e.g. browser windows) may be opened without tool or menu bars or access to menus may be disallowed.

To restrict the ability copy such content a configurable governor that disallows rapid paging through the rendered digital content may also be employed by browser based reader application 186 such that the speed at which the digital content can be paged through can be governed to prevent the automated or scripted attempts to copy such content. Such a configurable governor may allow skipping between pages but not allow access from one page to a subsequent or following page before a certain time has elapsed.

Figure 3:
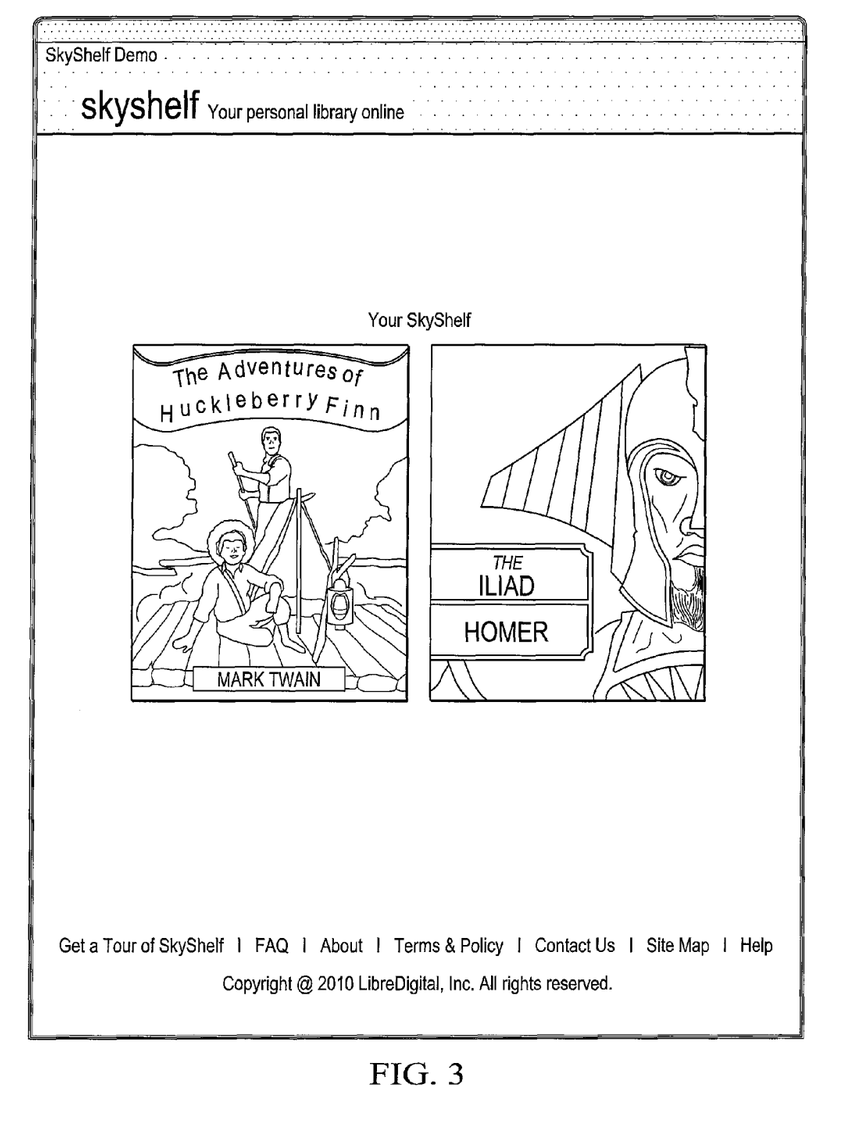
FIGS. 3-5 are depictions of an interface that may be presented by a browser based reader.
Figure 4:
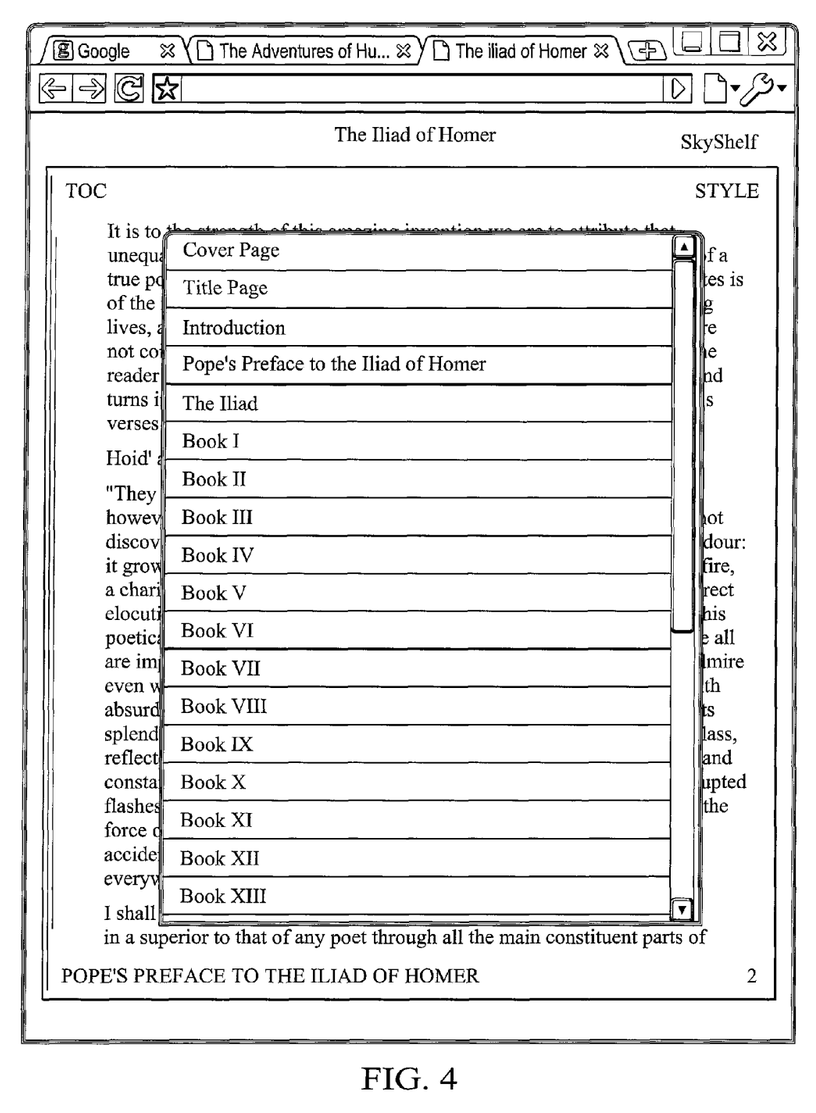
Figure 5:
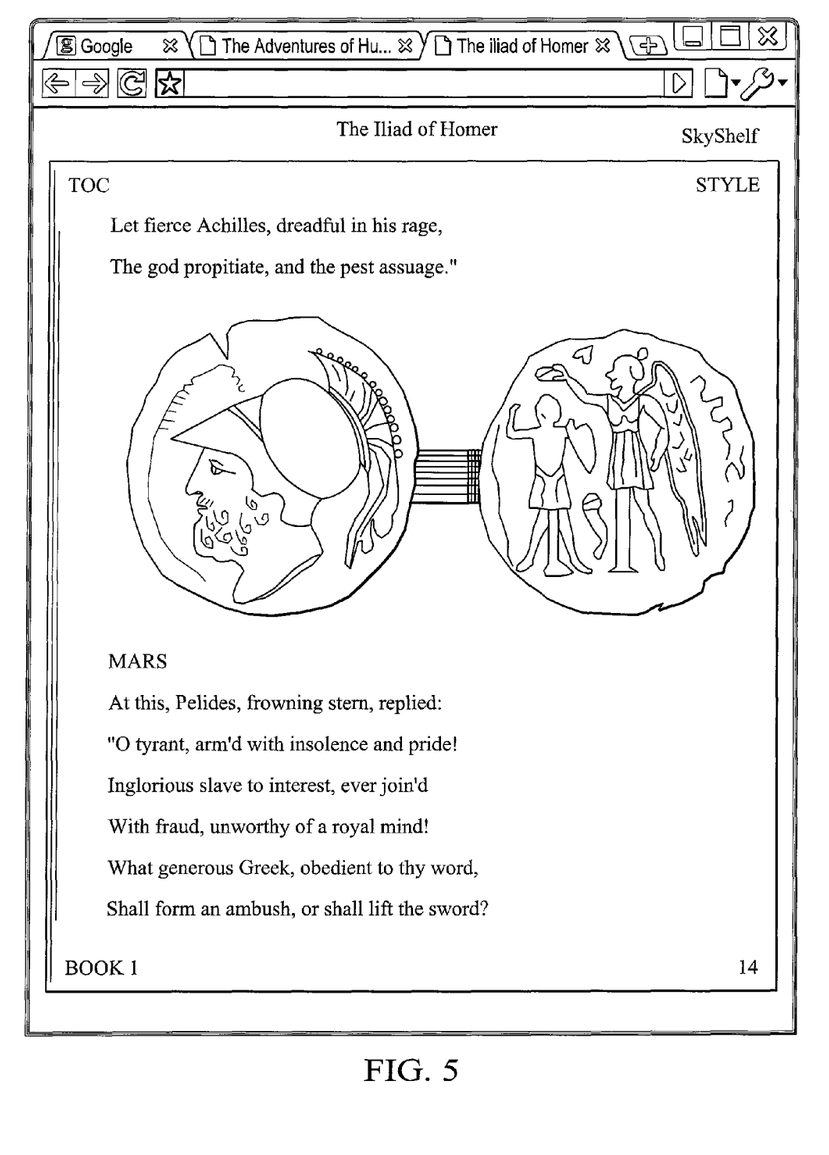

It may be useful here to give various examples of interfaces which may be utilized by a browser based reader application in accordance with embodiments described herein. FIGS. 3-5 depict embodiments of such interfaces. More specifically, FIG. 3 depicts an interface for use with a browser based reader application that presents a user with content items to which the user has access and allows the user selection of such content items. FIG. 4 depicts an interface for use with a browser based reader application that presents a user with a list of portions of a selected content item that the user may request. FIG. 5 depicts an interface for use with a browser based reader application that presents a user with a selected portion of content.

As discussed above, in some embodiments, to achieve content protection that prevents, for example, copying and pasting of content, including viewing the source of a rendered page and copying and pasting the text of the content from that page or easily printing the content, may be to perform a double-byte mapping on each portion of the content.

In one embodiment, this double-byte mapping may comprise mapping characters of a portion of content to a double-byte font which may be irrelevant or unknown and converting these characters back to a font renderable by browser 142 when the portion of content is delivered to the browser based reader application 186. Thus, a character of the portion may be coded (encoded) according to an original font. A set of these characters (which may be all of the characters of the portion) are each remapped (encoded) to an associated character at a random location in the high band of the Unicode 16 bit section. This location may not be easily selectable and may be in a private area so keyboard mapping may be difficult to impossible. When the portion of content is received at the browser based reader application 186 the browser based reader application 186 maps the characters in that portion of content back to a renderable font at the time of rendering, however, if the source of the page rendered by the browser based reader application 186 is viewed these characters may not be viewable or may be displayed as an odd pictogram such as a square or the like.

Figure 6A:
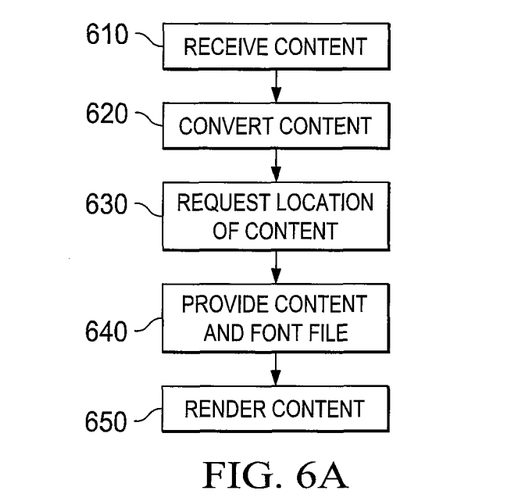
FIGS. 6A and 6B are diagrams of embodiments of a method for double-byte mapping.
Figure 6B:
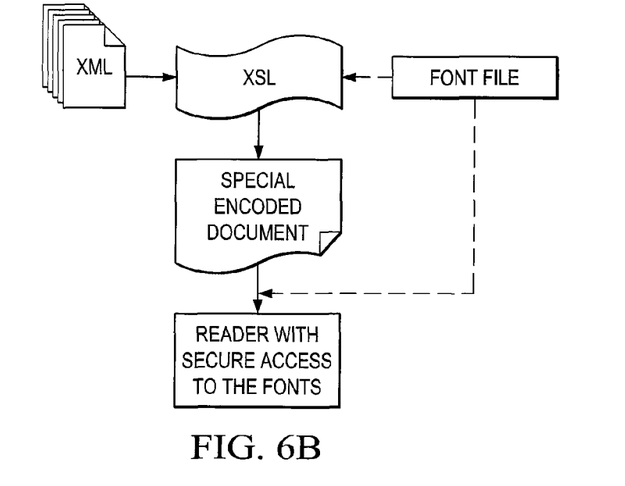

Referring now to FIG. 6A, one embodiment of a method for performing and utilizing this double-byte mapping is depicted. Initially, at step 610, content is received from a content provider. The content may for example, be received in an XML format. The content can be converted into a protected, encoded format at step 620. The conversion may be accomplished by running the received XML content against XSL that converts the content into the protected, encoded format. FIG. 6B graphically depicts one specific embodiment of the method for performing and utilizing double-byte mapping that employs XML formatted content and XSL.

In one embodiment, the conversion utilizes an encoded web font for text of the content to be displayed. "Encoded" means using a double-byte private font that byte-shifts the actual Unicode characters of the content to a send byte (e.g. an encoded byte). The text of the content is "shifted" or scrambled via an algorithm to match the font. Such a font may be visually decoded on for a user to read at the browser based reader application 186, but cannot be legible via a "view source" in any web tool.

Figure 7A:
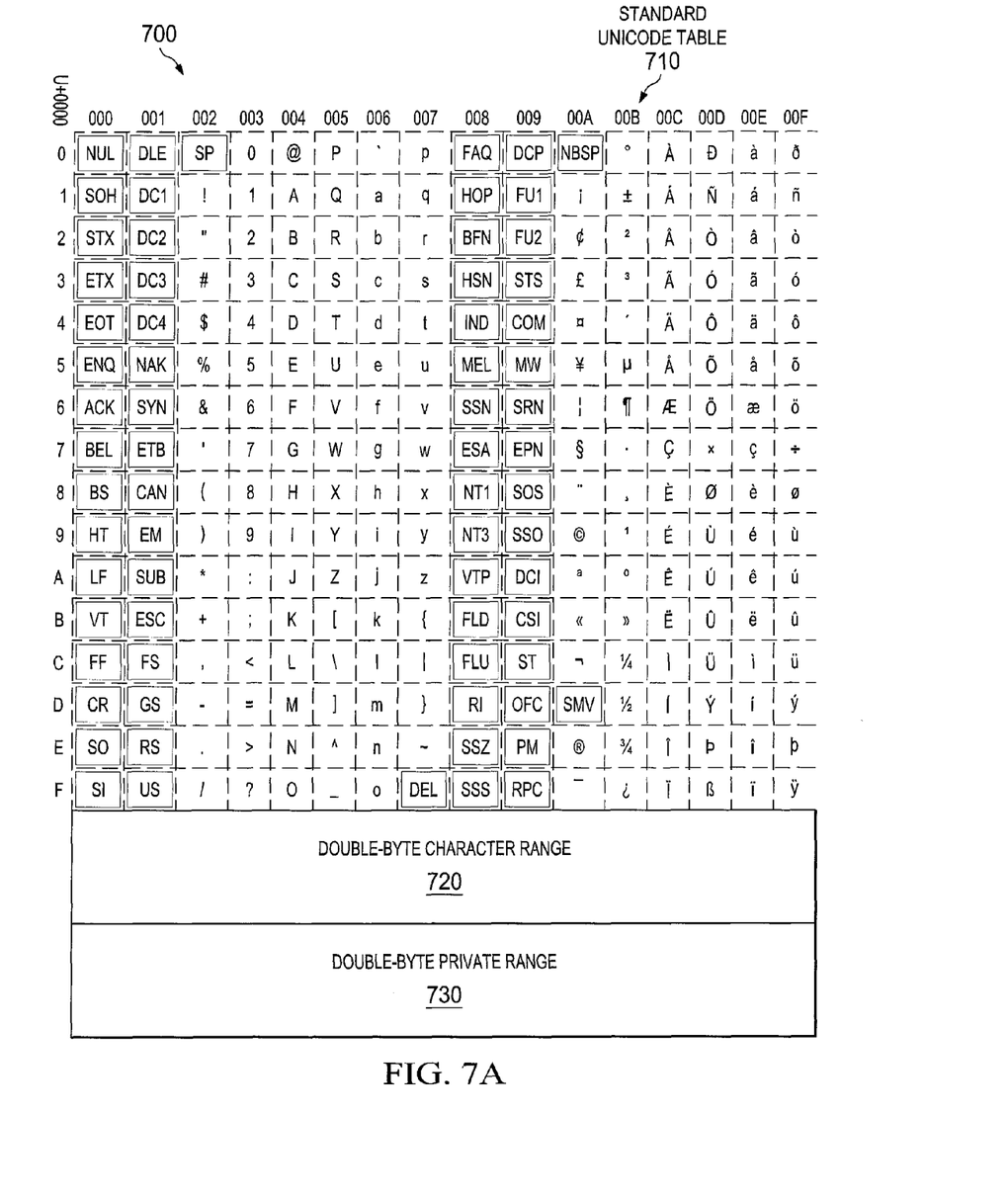
FIGS. 7A and 7B are diagrams representing the Unicode table.
Figure 7B:
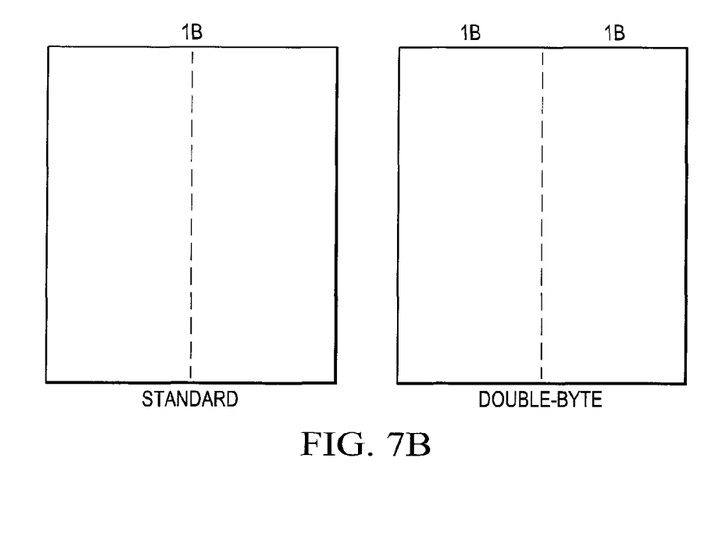

FIGS. 7A and 7B are a graphical representation of an embodiment of the Unicode character table. Unicode character table 700 can be divided into three main sections 1) standard UTF-8 range 710 2) double-byte character range (contains most Asian fonts) 720 and 3) double-byte private range 730 (no standard keyboard reaches into this non-input area). The conversion may employ an algorithm that maps a unique font set (e.g. created by operators of the content distribution system 120) to the double-byte private area 730 of the character table 700.

Figure 8:
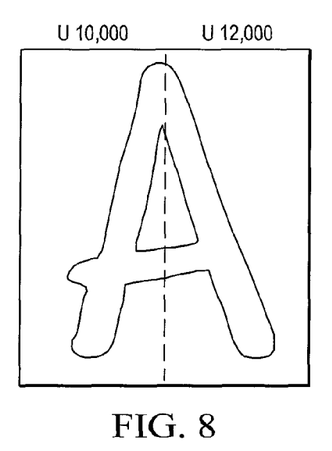
FIGS. 8 and 9 are diagrams representing embodiments of fonts.
Figure 9:
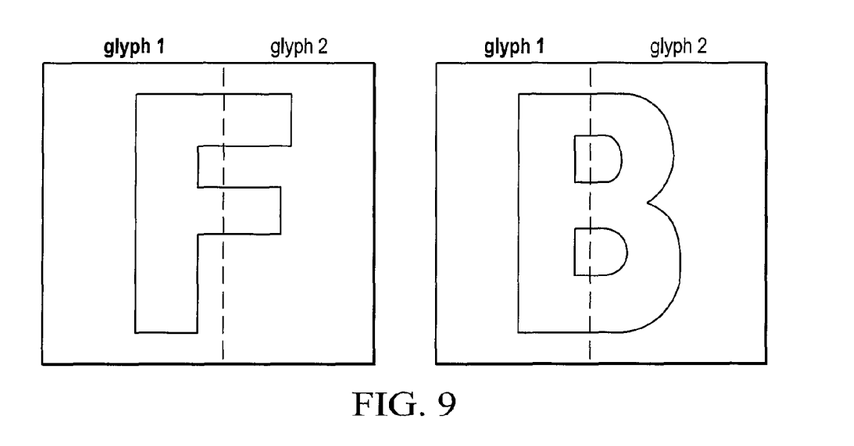

There may be different levels of encoding that may be employed, with differing levels of security offered by each. In one embodiment, a non-sequential 1:1 mapping of a font image to a character in the double-byte private area 730 may be utilized. In another embodiment, a specialty font may be created where the bytes of the specialty font comprise portions of fonts split in two different locations, as depicted in FIG. 8. In yet another embodiment, some font images can share glyphs based on the physical appearance of those glyphs, as depicted in FIG. 9.

The XSL file 152 that is created to convert content from the content provider must be in sync with the font file 158. These files can be modified as needed to utilize different fonts and different character sets, or to use different schemes for different areas of the document for even greater security. For example, one section or paragraph of the file can be encoded using a first method, while other sections of paragraphs of the file can be encoded using another method.

After the portions of content are received from a content provider and converted into the double-byte mapped content files, they may be stored as browser based reader content 156 and made available for use along with the font files 158 for the font used to convert that content. Returning to FIGS. 6A and 6B, when a browser based reader application 186 at a user's browser 142 requests a portion of this content at step 630, the portion of the content and the font file 158 used to convert that portion of content may be provided to the executing browser based reader application 186 by the content distribution system 120 at step 640. The browser based reader application 186 decodes the content using the font file 158 and renders the decoded content for displayed in the browser based reader application 186 at step 650.

Although the invention has been described with respect to specific embodiments thereof, these embodiments are merely illustrative, and not restrictive of the invention. The description herein of illustrated embodiments of the invention is not intended to be exhaustive or to limit the invention to the precise forms disclosed herein (and in particular, the inclusion of any particular embodiment, feature or function is not intended to limit the scope of the invention to such embodiment, feature or function). Rather, the description is intended to describe illustrative embodiments, features and functions in order to provide a person of ordinary skill in the art context to understand the invention without limiting the invention to any particularly described embodiment, feature or function. While specific embodiments of, and examples for, the invention are described herein for illustrative purposes only, various equivalent modifications are possible within the spirit and scope of the invention, as those skilled in the relevant art will recognize and appreciate. As indicated, these modifications may be made to the invention in light of the foregoing description of illustrated embodiments of the invention and are to be included within the spirit and scope of the invention. Thus, while the invention has been described herein with reference to particular embodiments thereof, a latitude of modification, various changes and substitutions are intended in the foregoing disclosures, and it will be appreciated that in some instances some features of embodiments of the invention will be employed without a corresponding use of other features without departing from the scope and spirit of the invention as set forth. Therefore, many modifications may be made to adapt a particular situation or material to the essential scope and spirit of the invention.

Reference throughout this specification to "one embodiment," "an embodiment," or "a specific embodiment" or similar terminology means that a particular feature, structure, or characteristic described in connection with the embodiment is included in at least one embodiment and may not necessarily be present in all embodiments. Thus, respective appearances of the phrases "in one embodiment," "in an embodiment," or "in a specific embodiment" or similar terminology in various places throughout this specification are not necessarily referring to the same embodiment. Furthermore, the particular features, structures, or characteristics of any particular embodiment may be combined in any suitable manner with one or more other embodiments. It is to be understood that other variations and modifications of the embodiments described and illustrated herein are possible in light of the teachings herein and are to be considered as part of the spirit and scope of the invention.

In the description herein, numerous specific details are provided, such as examples of components and/or methods, to provide a thorough understanding of embodiments of the invention. One skilled in the relevant art will recognize, however, that an embodiment may be able to be practiced without one or more of the specific details, or with other apparatus, systems, assemblies, methods, components, materials, parts, and/or the like. In other instances, well-known structures, components, systems, materials, or operations are not specifically shown or described in detail to avoid obscuring aspects of embodiments of the invention. While the invention may be illustrated by using a particular embodiment, this is not and does not limit the invention to any particular embodiment and a person of ordinary skill in the art will recognize that additional embodiments are readily understandable and are a part of this invention.

Any suitable programming language can be used to implement the routines, methods or programs of embodiments of the invention described herein, including C, C++, Java, assembly language, etc. Different programming techniques can be employed such as procedural or object oriented. Any particular routine can execute on a single computer processing device or multiple computer processing devices, a single computer processor or multiple computer processors. Data may be stored in a single storage medium or distributed through multiple storage mediums, and may reside in a single database or multiple databases (or other data storage techniques). Although the steps, operations, or computations may be presented in a specific order, this order may be changed in different embodiments. In some embodiments, to the extent multiple steps are shown as sequential in this specification, some combination of such steps in alternative embodiments may be performed at the same time. The sequence of operations described herein can be interrupted, suspended, or otherwise controlled by another process, such as an operating system, kernel, etc. The routines can operate in an operating system environment or as stand-alone routines. Functions, routines, methods, steps and operations described herein can be performed in hardware, software, firmware or any combination thereof.

Embodiments described herein can be implemented in the form of control logic in software or hardware or a combination of both. The control logic may be stored in an information storage medium, such as a computer-readable medium, as a plurality of instructions adapted to direct an information processing device to perform a set of steps disclosed in the various embodiments. Based on the disclosure and teachings provided herein, a person of ordinary skill in the art will appreciate other ways and/or methods to implement the invention.

It is also within the spirit and scope of the invention to implement in software programming or of the steps, operations, methods, routines or portions thereof described herein, where such software programming or code can be stored in a computer-readable medium and can be operated on by a processor to permit a computer to perform any of the steps, operations, methods, routines or portions thereof described herein. The invention may be implemented by using software programming or code in one or more general purpose digital computers, by using application specific integrated circuits, programmable logic devices, field programmable gate arrays, optical, chemical, biological, quantum or nanoengineered systems, components and mechanisms may be used. In general, the functions of the invention can be achieved by any means as is known in the art. For example, distributed, or networked systems, components and circuits can be used. In another example, communication or transfer (or otherwise moving from one place to another) of data may be wired, wireless, or by any other means.

A "computer-readable medium" may be any medium that can contain, store, communicate, propagate, or transport the program for use by or in connection with the instruction execution system, apparatus, system or device. The computer readable medium can be, by way of example, only but not by limitation, an electronic, magnetic, optical, electromagnetic, infrared, or semiconductor system, apparatus, system, device, propagation medium, or computer memory. Such computer-readable medium shall generally be machine readable and include software programming or code that can be human readable (e.g., source code) or machine readable (e.g., object code).

A "processor" includes any, hardware system, mechanism or component that processes data, signals or other information. A processor can include a system with a general-purpose central processing unit, multiple processing units, dedicated circuitry for achieving functionality, or other systems. Processing need not be limited to a geographic location, or have temporal limitations. For example, a processor can perform its functions in "real-time," "offline," in a "batch mode," etc. Portions of processing can be performed at different times and at different locations, by different (or the same) processing systems.

It will also be appreciated that one or more of the elements depicted in the drawings/figures can also be implemented in a more separated or integrated manner, or even removed or rendered as inoperable in certain cases, as is useful in accordance with a particular application. Additionally, any signal arrows in the drawings/figures should be considered only as exemplary, and not limiting, unless otherwise specifically noted.

Furthermore, the term "or" as used herein is generally intended to mean "and/or" unless otherwise indicated. As used herein, a term preceded by "a" or "an" (and "the" when antecedent basis is "a" or "an") includes both singular and plural of such term (i.e., that the reference "a" or "an" clearly indicates only the singular or only the plural). Also, as used in the description herein, the meaning of "in" includes "in" and "on" unless the context clearly dictates otherwise.

Benefits, other advantages, and solutions to problems have been described above with regard to specific embodiments. However, the benefits, advantages, solutions to problems, and any component(s) that may cause any benefit, advantage, or solution to occur or become more pronounced are not to be construed as a critical, required, or essential feature or component.

What is claimed is:

1. A method for securing digital content presented in a browser based viewer, comprising performing the following steps in a content distribution system:

receiving a particular piece of digital content, wherein the particular piece of digital content comprises a plurality of different portions;

storing each portion of the plurality of different portions of the particular piece of digital content in a corresponding one of a plurality of first directories, wherein the first directory corresponding to each portion of the plurality of portions of digital content is different;

receiving a user name and a password from a browser at a user computer device;

establishing an authenticated session with the browser;

providing a browser based viewer from the content distribution system to the browser on the user computer device;

receiving a first request for the particular piece of digital content from the browser based viewer;

providing a location of at least one portion of the plurality of different portions of the particular piece of digital content to the browser based viewer, wherein the location is different from the first directory corresponding to the at least one portion of the plurality of different portions of the particular piece of digital content;

receiving a second request for the location of the at least one portion of the plurality of different portions of the particular piece of digital content from the browser based viewer;

determining the first directory corresponding to the at least one portion of the plurality of different portions of the particular piece of digital content based on the second request and the authenticated session; and providing the at least one portion of the plurality of different portions of the particular piece of digital content to the browser based viewer from the first directory.

2. The method of claim 1, wherein at least one portion of the plurality of different portions of content comprises a set of characters and the set of characters are mapped to a double-byte font.

3. The method of claim 2, wherein the path of each of the first directories is algorithmically determined.

4. The method of claim 3, wherein the browser based viewer is obfuscated JavaScript code.

5. The method of claim 4, wherein at least one portion of the plurality of different portions of digital content is a bitmap, wherein the at least one portion of the plurality of different portions of digital content is rendered by the browser based viewer and the at least one portion of the plurality of different portions of digital content is tagged by the browser based viewer when it is rendered, wherein the browser based viewer is executed in the browser at the user computer device and one or more menus of the browser are disabled by the browser based viewer, and wherein copying and pasting is disabled in the browser by the browser based viewer.

6. The method of claim 1, wherein providing the location of the at least one portion of the plurality of different portions of the particular piece of digital content to the browser based viewer comprises providing the location of only a single portion of the plurality of different portions of the particular piece of digital content to the browser based viewer.

7. The method of claim 1, wherein providing the at least one portion of the plurality of different portions of the particular piece of digital content to the browser based viewer from the directory comprises providing multiple portions of the plurality of different portions of the particular piece of digital content to the browser based viewer, wherein each portion of the plurality of different portions of the particular piece of digital content is encrypted, and wherein each portion of the plurality of different portions of the particular piece of digital content has a unique encryption key.

8. The method of claim 1, further comprising:
providing one or more tokens to the browser on the user computer device, wherein each of the one or more tokens has an associated lifetime; and
disallowing requests from the browser on the user computer device that do not include an unexpired one of the one or more tokens.

9. A system for distributing digital content, comprising
a content distribution system coupled to one or more content publishers over a network, the content transformation system including:
a processor, and
a non-transitory computer readable medium comprising instructions executable for:

receiving a particular piece of digital content, wherein the particular piece of digital content comprises a plurality of different portions;

storing each portion of the plurality of different portions of the particular piece of digital content in a corresponding one of a plurality of first directories, wherein the first directory corresponding to each portion of the plurality of portions of digital content is different;

receiving a user name and a password from a browser at a user computer device;

establishing an authenticated session with the browser;

providing a browser based viewer to the browser on the user computer device;

receiving a first request for the particular piece of digital content from the browser based viewer;

providing a location of at least one portion of the plurality of different portions of the particular piece of digital content to the browser based viewer, wherein the location is different from the first directory corresponding to the at least one portion of the plurality of different portions of the particular piece of digital content;

receiving a second request for the location of the at least one portion of the plurality of different portions of the particular piece of digital content from the browser based viewer;

determining the first directory corresponding to the at least one portion of the plurality of different portions of the particular piece of digital content based on the second request and the authenticated session; and providing the at least one portion of the plurality of different portions of the particular piece of digital content to the browser based viewer from the first directory.

10. The system of claim 9, wherein at least one portion of the plurality of different portions of content comprises a set of characters and the set of characters are mapped to a double-byte font.

11. The method of claim 10, wherein the path of each of the first directories is algorithmically determined.

12. The system of claim 11, wherein the browser based viewer is obfuscated JavaScript code.

13. The system of claim 12, wherein at least one portion of the plurality of different portions of digital content is a bitmap, wherein the at least one portion of the plurality of different portions of digital content is rendered by the browser based viewer and the at least one portion of the plurality of different portions of digital content is tagged by the browser based viewer when it is rendered, wherein the browser based viewer is executed in the browser at the user computer device and one or more menus of the browser are disabled by the browser based viewer, and wherein copying and pasting is disabled in the browser by the browser based viewer.

14. The system of claim 9, wherein providing the location of the at least one portion of the plurality of different portions of the particular piece of digital content to the browser based viewer comprises providing the location of only a single portion of the plurality of different portions of the particular piece of digital content to the browser based viewer.

15. The system of claim 9, wherein providing the at least one portion of the plurality of different portions of the particular piece of digital content to the browser based viewer from the directory comprises providing multiple portions of the plurality of different portions of the particular piece of digital content to the browser based viewer, wherein each portion of the plurality of different portions of the particular piece of digital content is encrypted, and wherein each portion of the plurality of different portions of the particular piece of digital content has a unique encryption key.

16. The system of claim 9, wherein the instructions are further executable for:
providing one or more tokens to the browser on the user computer device, wherein each of the one or more tokens has an associated lifetime; and
disallowing requests from the browser on the user computer device that do not include an unexpired one of the one or more tokens.

17. A non-transitory computer readable medium, comprising instructions for:
receiving a particular piece of digital content, wherein the particular piece of digital content comprises a plurality of different portions;
storing each portion of the plurality of different portions of the particular piece of digital content in a corresponding one of a plurality of first directories, wherein the first directory corresponding to each portion of the plurality of portions of digital content is different;
receiving a user name and a password from a browser at a user computer device;
establishing an authenticated session with the browser;
providing a browser based viewer from the content distribution system to the browser on the user computer device;
receiving a first request for the particular piece of digital content from the browser based viewer;
providing a location of at least one portion of the plurality of different portions of the particular piece of digital content to the browser based viewer, wherein the location is different from the first directory corresponding to the at least one portion of the plurality of different portions of the particular piece of digital content;
receiving a second request for the location of the at least one portion of the plurality of different portions of the particular piece of digital content from the browser based viewer;
determining the first directory corresponding to the at least one portion of the plurality of different portions of the particular piece of digital content based on the second request and the authenticated session; and
providing the at least one portion of the plurality of different portions of the particular piece of digital content to the browser based viewer from the first directory.

18. The computer readable medium of claim 17, wherein at least one portion of the plurality of different portions of content comprises a set of characters and the set of characters are mapped to a double-byte font.

19. The computer readable medium of claim 18, wherein the path of each of the first directories is algorithmically determined.

20. The computer readable medium of claim 19, wherein the browser based viewer is obfuscated JavaScript code.

21. The computer readable medium of claim 20, wherein at least one portion of the plurality of different portions of digital content is a bitmap, wherein the at least one portion of the plurality of different portions of digital content is rendered by the browser based viewer and the at least one portion of the plurality of different portions of digital content is tagged by the browser based viewer when it is rendered, wherein the browser based viewer is executed in the browser at the user computer device and one or more menus of the browser are disabled by the browser based viewer, and wherein copying and pasting is disabled in the browser by the browser based viewer.

22. The computer readable medium of claim 17, wherein providing the location of the at least one portion of the plurality of different portions of the particular piece of digital content to the browser based viewer comprises providing the location of only a single portion of the plurality of different portions of the particular piece of digital content to the browser based viewer.

23. The computer readable medium of claim 17, wherein providing the at least one portion of the plurality of different portions of the particular piece of digital content to the browser based viewer from the directory comprises providing multiple portions of the plurality of different portions of the particular piece of digital content to the browser based viewer, wherein each portion of the plurality of different portions of the particular piece of digital content is encrypted, and wherein each portion of the plurality of different portions of the particular piece of digital content has a unique encryption key.

24. The computer readable medium of claim 17, further comprising instructions for:
providing one or more tokens to the browser on the user computer device, Wherein each of the one or more tokens has an associated lifetime; and
disallowing requests from the browser on the user computer device that do not include an unexpired one of the one or more tokens.

* * * * *